United States Patent
Eike et al.

[11] Patent Number: 5,902,344
[45] Date of Patent: May 11, 1999

[54] MANIFOLD APPARATUS FOR CALIBRATING CLUTCH FILL TIMES

[75] Inventors: Craig R. Eike, DeKalb; Guy T. Stoever; Kevin D. McKee, both of Naperville, all of Ill.

[73] Assignee: Case Corporation, Racine, Wis.

[21] Appl. No.: 08/671,216

[22] Filed: Jun. 27, 1996

[51] Int. Cl.⁶ .................................................. G06G 7/70
[52] U.S. Cl. ............................ 701/67; 701/66; 74/335; 74/336 R; 192/109 F; 192/3.3
[58] Field of Search ................. 701/51, 62, 66, 67, 68; 192/3.58, 3.3, 3.31, 3.22, 4 A, 4 C, 3.57, 51, 87.19, 109 F, 87.13; 74/335, 336 R, 360, 365; 477/63, 65, 62, 98, 72, 78, 69, 151, 162; 475/65, 129, 64, 78, 80

[56] References Cited

U.S. PATENT DOCUMENTS

| | | | |
|---|---|---|---|
| 3,570,522 | 3/1971 | Horsch | 137/115.03 |
| 3,762,518 | 10/1973 | Hilpert | 192/87.13 |
| 3,964,372 | 6/1976 | Chatterjea | 192/109 F |
| 4,033,203 | 7/1977 | Hirosawa et al. | 74/869 |
| 4,043,227 | 8/1977 | Beals et al. | 74/868 |
| 4,051,932 | 10/1977 | Arai et al. | 192/3.3 |
| 4,069,843 | 1/1978 | Chatterjea | 137/625.69 |
| 4,074,796 | 2/1978 | Hoehn et al. | 192/87.13 |
| 4,164,876 | 8/1979 | Peppel | 74/336 R |
| 4,194,608 | 3/1980 | Usui et al. | 192/3.58 |
| 4,301,689 | 11/1981 | Peppel | 74/336 R |
| 4,428,259 | 1/1984 | Kubo et al. | 477/65 |
| 4,441,385 | 4/1984 | Taga et al. | 74/867 |
| 4,608,873 | 9/1986 | Redzinski | 74/336 R |
| 4,676,348 | 6/1987 | Coutant | 192/3.57 |
| 4,843,902 | 7/1989 | Patton et al. | 74/335 R |
| 4,848,530 | 7/1989 | Chess | 192/3.58 |
| 4,989,471 | 2/1991 | Bulgrien | 74/336 R |
| 5,012,415 | 4/1991 | Boe et al. | 701/50 |
| 5,012,416 | 4/1991 | Bulgrien et al. | 701/67 |
| 5,012,690 | 5/1991 | Bulgrien | 74/335 |
| 5,036,718 | 8/1991 | Bulgrien | 74/335 |
| 5,072,390 | 12/1991 | Lentz et al. | 701/60 |
| 5,224,577 | 7/1993 | Falck et al. | 74/336 R |
| 5,249,658 | 10/1993 | Goeckner et al. | 192/3.58 |
| 5,450,768 | 9/1995 | Bulgrien et al. | 74/336 R |

FOREIGN PATENT DOCUMENTS

0786609A2  7/1997  European Pat. Off. .

*Primary Examiner*—Jacques H. Louis-Jacques
*Attorney, Agent, or Firm*—Foley & Lardner

[57] ABSTRACT

In a vehicle having a power shift transmission engageable in a plurality of forward gear ratios by engaging and disengaging first and second fluid clutches with a fluid from a fluid supply, a manifold apparatus for measuring a pressure of the fluid and simultaneously filling the first and second clutches with the fluid supply having a first clutch fill valve fluidly coupled to the first clutch to control the flow of the fluid to the first clutch; a second clutch fill valve fluidly coupled to the second clutch to control the flow of the fluid to the second clutch; a manifold fluidly coupled to the first and second clutch valves to conduct the fluid from the fluid supply to the first and second clutch valves; a first flow restrictor disposed between the manifold and the fluid supply to restrict the flow of the fluid from the fluid supply to the manifold; and a pressure transducer fluidly communicating with the manifold to generate a signal representative of the pressure of the fluid within the manifold, where the first and second clutches are not simultaneously engaged to provide any of the plurality of forward gear ratios.

24 Claims, 7 Drawing Sheets

MANIFOLD APPARATUS FOR CALIBRATING CLUTCH FILL TIMES

BACKGROUND OF THE INVENTION

The present invention relates generally to control of a power transmission in a work vehicle such as an agricultural tractor. More particularly, the invention relates to an improved technique for calibrating clutch fill rates for clutches incorporated in such transmissions.

In the field of transmission systems for work vehicles, such as agricultural tractors, a number of transmission configurations and control schemes have been proposed and are presently in use. Such transmissions typically include a collection of intermeshing gears either fixed to transmission shafts or rotating freely on the shafts. Clutches associated with the freely rotating gears may be selectively engaged to establish a series of speed ratios between an engine output shaft and a transmission output shaft to transmit engine torque at a desired speed to driven wheels of the vehicle. Control systems for commanding engagement of the clutches typically include electronic circuitry that responds to operator controls, such as an upshift/downshift lever, a forward/reverse lever and the like in the vehicle cab. The control system sends electric signals to hydraulic valves that channel pressurized fluid to the clutches. The control systems thus cause the clutches to engage and disengage in predetermined combinations to accelerate, decelerate and drive the vehicle as desired by the operator. Transmissions and control systems of this type are described in U.S. Pat. No. 4,425,620, issued on Jan. 10, 1984 and assigned to Steiger Tractor, Inc., and U.S. Pat. No. 4,967,385, issued on Oct. 30, 1990 and assigned to J.I. Case Company.

Direct shifting between gears is often provided for in transmissions such as those described above. This process, called "power shifting" involves disengaging a first set of one or more clutches (the "off-going clutches") while substantially simultaneously engaging a second set of one or more clutches (the "on-coming clutches"). This is especially valuable when a work vehicle is in forward motion, attached to an implement. Both first and second sets of clutches cannot be engaged at the same time (called "lockup") with the engine rotating the transmission input shaft without causing serious wear and possible damage. On the other hand, if the off-going clutches are disengaged long before the on-coming clutches are engaged, the tractor will be disengaged entirely for a period of time, and will decelerate. This phenomenon is called a "torque-hole" in industry parlance. The optimum situation is to begin engaging the oncoming clutches while the off-going clutches are being disengaged. Thus, as torque applied by the off-going clutches decreases, torque applied by the oncoming clutches increases. This overlap of torques eliminates the torque hole and provides a smoother transition between gears.

It is difficult to properly overlap the torques due to inherent and changeable time delays during clutch engagement and disengagement. Hydraulic clutches must be filled with hydraulic fluid for an initial period ("fill time") before they begin engaging and transmitting torque. Furthermore, clutch valves have a built-in lag from the time they are energized to the time they open and permit fluid to flow. The result is an inherent delay between the time the on-coming clutch valves are signaled to operate, and the time torque begins to be transmitted by the on-coming clutch. One solution to this problem is to monitor the pressure in each clutch as the clutch fills in order to determine the point of incipient engagement, which appears as a sudden pressure spike in the clutch. Measuring the pressure in each clutch requires a pressure transducer for each clutch, however. This adds to the complexity of the system and the likelihood of component failure.

There is a need, therefore, for an improved apparatus for calibrating clutch fill times, especially for clutches in power shift transmissions. In particular, there is a need for an apparatus adapted to determine the fill times of a plurality of clutches using fewer than one pressure transducer per each clutch calibrated. More particularly, there is a need for an apparatus that can determine clutch fill times while a vehicle is being operated.

SUMMARY OF THE INVENTION

The present invention provides a novel manifold apparatus for calibrating the fill times of clutches with fewer pressure transducers than the number of clutches that are calibrated, that is particularly suited for power shift transmissions used in work vehicles, such as combines and tractors.

Thus, in accordance with a first aspect of the invention, in a vehicle having a power shift transmission engageable in a plurality of forward gear ratios by engaging and disengaging first and second fluid clutches with a fluid from a fluid supply, a manifold apparatus for measuring a pressure of the fluid and simultaneously filling the first and second clutches with the fluid, including first and second clutch fill valves coupled to first and second clutches to fill the first and second clutches, respectively; a manifold coupled to the first and second clutch fill valves to conduct fluid to the valves; a first flow restrictor between the manifold and the fluid supply to restrict the flow of fluid to the manifold; and a pressure transducer for sensing pressure in the manifold, where the first and second clutches are not simultaneously engaged to provide any of the forward gear ratios. The restrictor conducts flow to each clutch when its respective valve is opened. Furthermore, it may be adjustable, or a hydro-mechanical modulator valve responsive to pressure at the outlet of the restrictor. An additional flow restrictor may be located at the inlet of one of the valves to reduce the pressure drop at the pressure transducer, preferably having an effective orifice diameter of 0.06 to 0.30 inches.

In accordance with yet another aspect of the invention, in a vehicle having a transmission for propelling the vehicle in a plurality of forward gear ratios, the gear ratios engageable by a plurality of clutches, such that a first and a second one of the plurality of clutches are never simultaneously engaged to provide any of the forward gear ratios, and such that a third and a fourth of the plurality of clutches are never simultaneously engaged to provide any of the forward gear ratios, a manifold apparatus for measuring fluid pressure and simultaneously filling the plurality of clutches with a fluid from a fluid supply, including a first clutch fill valve, coupled to a first clutch to control fluid flow to the first clutch; a second clutch fill valve coupled to a second clutch to control fluid flow to the second clutch; a first manifold coupled to the first and second clutch valves to conduct the fluid from the fluid supply to the first and second valves; a first flow restrictor disposed between the first manifold and the fluid supply to restrict the flow of the fluid from the fluid supply to the first manifold; and a first pressure transducer fluidly communicating with the first manifold to generate a signal representative of the pressure of the fluid within the first manifold. The apparatus may also include a third clutch fill valve coupled to a third clutch to control fluid flow to the third clutch; a fourth clutch fill valve coupled to a fourth clutch to control fluid flow to the fourth clutch; a second manifold coupled to the third and fourth clutch valves to conduct the fluid from the fluid supply to the third and fourth valves; a second flow restrictor disposed between the second manifold and the fluid supply to restrict the flow of the fluid from the fluid supply to the first manifold; and a second pressure transducer fluidly communicating with the second manifold to generate a signal representative of the pressure of the fluid within the second manifold.

BRIEF DESCRIPTION OF THE DRAWINGS

The present invention will become more fully understood from the following detailed description of the preferred embodiment, taken in conjunction with the accompanying drawings, wherein like reference numerals refer to like parts, in which.

DETAILED DESCRIPTION OF THE PREFERRED EMBODIMENT

Figure 1:
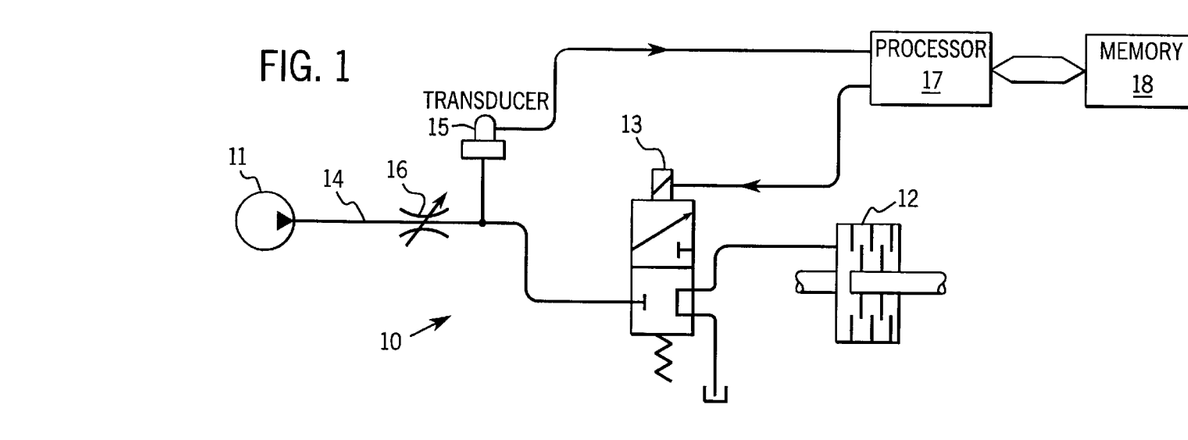
FIG. 1 is a schematic illustration of a clutch fill and calibration apparatus.

Turning now to the drawings, FIG. 1 illustrates a schematic view of a clutch engagement apparatus 10 connected to a hydraulic supply 11 and clutch 12. Apparatus 10 includes a valve 13 connected to clutch 12. Valve 13, in turn, is connected to hydraulic supply 11 via a second hydraulic conduit 14. Hydraulic conduit 14 is also connected to a pressure transducer 15. A fluid flow restrictor 16 is located in conduit 14 between hydraulic supply 11 and valve 13. A processor 17 is connected to both the valve and the pressure transducer, and communicates with a memory 18.

Clutch 12 is preferably a normally open hydraulic clutch, e.g. one that is engaged by filling with fluid. Valve 13 regulates the flow of hydraulic fluid between the hydraulic supply 11 and clutch 12, and is preferably a solenoid actuated, spring return 3-way valve having an open and a closed position, i.e. opened to allow flow into clutch 12, or de-energized, i.e. closed to allow fluid to flow out of clutch 12. Valve 13 preferably includes a reverse flow preventing check valve in the energized position. This feature of valve 13 effectively prevents back flow through valve 13 in the event pressure supply to valve 13 drops temporarily with valve 13 in its energized state. Pressure transducer 15, disposed between valve 13 and hydraulic supply 11, measures hydraulic pressure in the conduit and produces a signal indicative of this hydraulic pressure. Fluid flow restrictor 16 is disposed in conduit 14 between hydraulic supply 11 and valve 13 to create a drop in hydraulic pressure between hydraulic supply 11 and valve 13 when valve 13 is opened and fluid flows into clutch 12. Pressure transducer 15 is positioned between fluid flow restrictor 16 and valve 13 and thereby indicates this pressure drop during clutch filling. Fluid flow restrictor 16 is shown here as an adjustable orifice, however, a fixed flow restrictor or a flow restrictor in combination with a modulator are also preferred.

Processor 17 controls the opening and closing of valve 13 by producing a valve opening and a valve closing signal that are communicated to valve 13. Processor 17 also receives the pressure signals generated by pressure transducer 15. Finally, it is adapted to calculate a time value representative of the time delay between valve opening (e.g. the valve opening signal) and incipient clutch engagement. The processor identifies incipient clutch engagement by monitoring pressure signals transmitted by the pressure transducer, and determining when the pressure indicated by those signals rises to a predetermined pressure and/or rises at a predetermined rate. This time delay is then recorded into memory 18. In addition, intermediate driver circuits between processor 17 and valve 13, and between processor 17 and pressure transducer 15 may be employed, as necessary, to amplify or condition the valve opening signal or the transducer signal, respectively. Such driver circuits are known to those skilled in the art. In the presently preferred embodiment, processor 17 is a microprocessor-based digital controller, such as an Intel 80C198 microcontroller and associated control circuitry having appropriate valve drivers and signal conditioning, configured by coded instructions embedded in the processor or the accompanying memory circuit. One or more other processors known to those skilled in the art may be employed in place of processor 17. A general flow chart of such coded instructions for calibrating clutch fill times are provided in FIG. 3, discussed below.

In an alternative embodiment a plurality of clutches can be rapidly and sequentially calibrated by connecting a plurality of clutch valves to the outlet of flow restrictor 16 in a manifold arrangement, such that each clutch valve receives fluid from flow restrictor 16. To each of these clutch valves, a clutch is attached to receive fluid from its respective valve. Similarly to FIG. 1, the processor is adapted to control each additional clutch valve. Each clutch may be calibrated by transmitting fluid through flow restrictor 16 and through each clutch valve to each clutch in turn. Since flow goes to only a single clutch at a time, the clutch fill delay is indicative of that clutch's fill time. Thus, a single pressure transducer and flow restrictor pair can sequentially calibrate a plurality of valves connected in a manifold arrangement.

Figure 2:
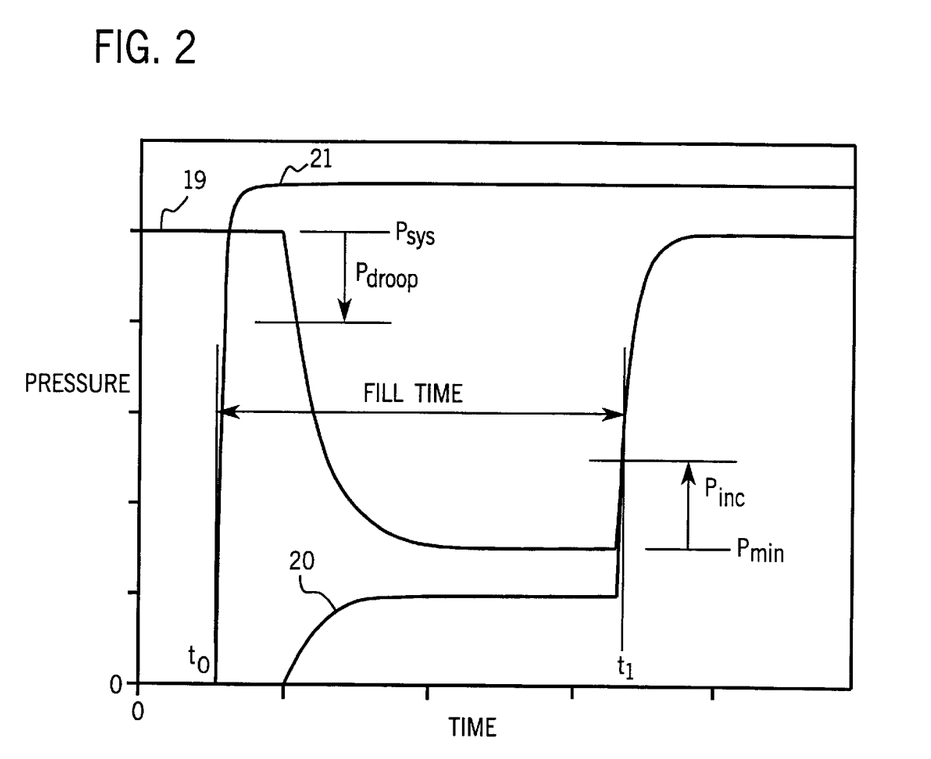
FIG. 2 is a diagram of hydraulic pressure curves for the engagement of the clutch of FIG. 1.

To illustrate the FIG. 1 calibration process, several hydraulic pressure curves for the clutch filling calibration process both before and after the opening of valve 13 are shown in FIG. 2. Curve 19 indicates the pressure at pressure transducer 15. Curve 20 indicates the pressure in clutch 12. Curve 21 indicates the current flowing through the coil of valve 13, which is an indirect indicator of the energization of valve 13. The processor signals valve 13 to open and conduct fluid to clutch 12 at time $t_0$. The current through the coil subsequently increases, and the valve opens. As the valve opens, transducer pressure drops from system pressure $P_{sys}$ to lower pressures $P_{droop}$, indicating that fluid is flowing into the clutch. As the pressure at the transducer drops, pressure in the clutch rises as the clutch fills as indicated by curve 20. The transducer pressure continues dropping, although at a slower rate as the clutch fills and the clutch plates move toward engagement. Finally, a lowermost pressure value is reached, and transducer pressure begins to rise rapidly. This is the point or range of incipient clutch engagement. The processor is adapted to identify incipient engagement when the transducer pressure, after recovering from its initial droop, reaches a predetermined hydraulic pressure and/or predetermined rate of change. This predetermined hydraulic pressure is preferably below the system pressure $P_{sys}$ and above the minimum pressure $P_{min}$. Most preferably, it is a predetermined incremental pressure $P_{inc}$ above the minimum pressure $P_{min}$. The processor may retrieve the predetermined pressure, or the incremental pressure, $P_{inc}$, used to calculate the predetermined pressure, from memory 18. Alternatively, the predetermined pressure may be a function of the system pressure or the minimum pressure.

Once the predetermined hydraulic pressure is reached, processor 17 calculates the time interval between valve energization and the time the predetermined hydraulic pressure was reached, and saves this value in memory 18 shown in FIG. 1. To calculate the clutch fill time, processor 17 preferably determines the difference between the time at which the clutch began to fill and the time the predetermined hydraulic pressure was attained. Since fluid flow into the clutch is difficult to measure, the processor can more easily determine the beginning of clutch filling indirectly, such as by measuring the current in the coil of valve 13, or recording the time at which the processor signaled valve 13 to open (the preferred method), or recording the time at which the $P_{sys}$ begins dropping.

Figure 3:
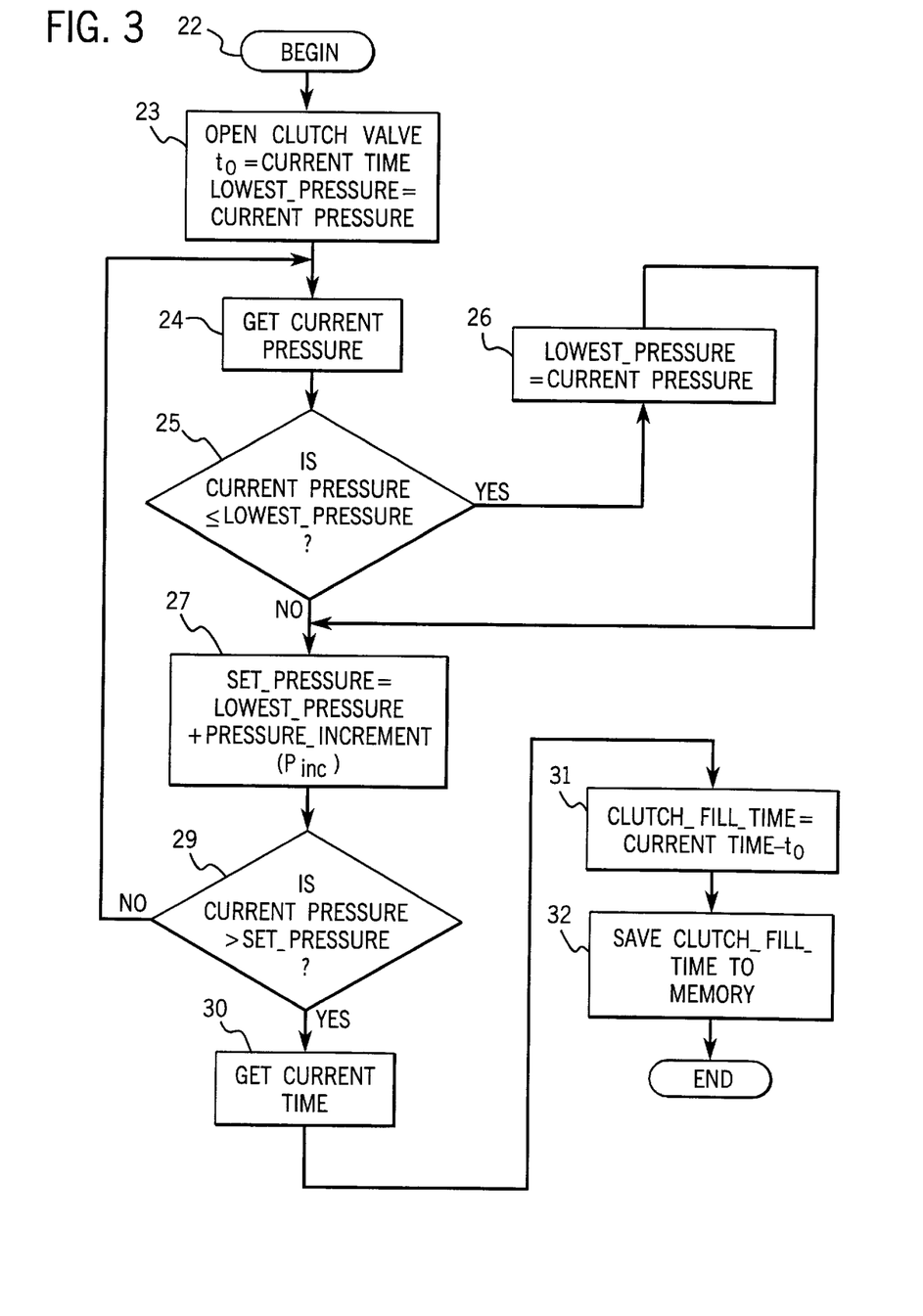
FIG. 3 is a flowchart of program steps for calibrating the clutch of FIG. 1.

To calibrate the clutch fill times, processor 17 must engage the clutch and simultaneously monitor the pressure measured by pressure transducer 15. A flow chart of the program steps executed during the fill time calibration is illustrated in FIG. 3. Execution starts at step 22. At step 23 processor 17 signals valve 13 to open and admit hydraulic fluid to clutch 12, saves the current transducer reading as the variable LOWEST_PRESSURE and saves a value indicative of the current time as variable $t_0$. At step 24, the processor enters a pressure reading loop, wherein it reads pressure values, compares the retrieved pressure reading against LOWEST_PRESSURE (step 25), and if the current pressure reading is lower than LOWEST_PRESSURE, saves the current pressure reading (step 26) as LOWEST_PRESSURE and proceeds to step 27 to continue execution. If the pressure reading (step 24) is greater than the previously saved pressure reading, as determined at step 25, this indicates that the minimum pressure ($P_{min}$ in FIG. 2) has been reached, and the hydraulic pressure measured at the transducer is now recovering and execution continues at step 27. In step 27, processor 17 calculates a parameter called SET_PRESSURE by adding the FIG. 2 pressure increment ($P_{inc}$) to LOWEST_PRESSURE ($P_{min}$) and saving the result as SET_PRESSURE. $P_{inc}$ may be a predefined value previously stored in memory and retrieved by the processor, or it may be calculated.

From step 27, the processor compares the current pressure reading to the value of SET_PRESSURE. If the current pressure reading is not greater than the value of SET_PRESSURE, the processor returns from step 29 to step 24 and repeats the sequence of steps described above. Once the current pressure reading exceeds the value of SET_PRESSURE at step 29, the processor proceeds to step 30 and again reads the current time. In step 31, processor 17 then calculates the time interval between valve energization and incipient clutch engagement, and saves this value to memory (step 32) as the clutch fill time. In the event processor 17 is connected to additional clutches in a manner similar to FIG. 1 and the accompanying text, processor 17 will disengage the additional clutches not required for the gear ratio to which the vehicle is to be shifted. In the presently preferred embodiment, disengagement of off-going clutches is scheduled by a fixed overlap (or exhaust) time table stored in memory. In general, the exhaust of off-going clutches may occur before or after the end of the fill time measurement sequence described above. By thus synchronizing clutch engagement and disengagement processor 17 prevents torque holes or transmission lock-up. The capability to calibrate clutches while synchronizing engagement and disengagement is of particular value when work vehicle transmissions are power shifted. Such a transmission is described below with regard to FIG. 4.

Figure 4:
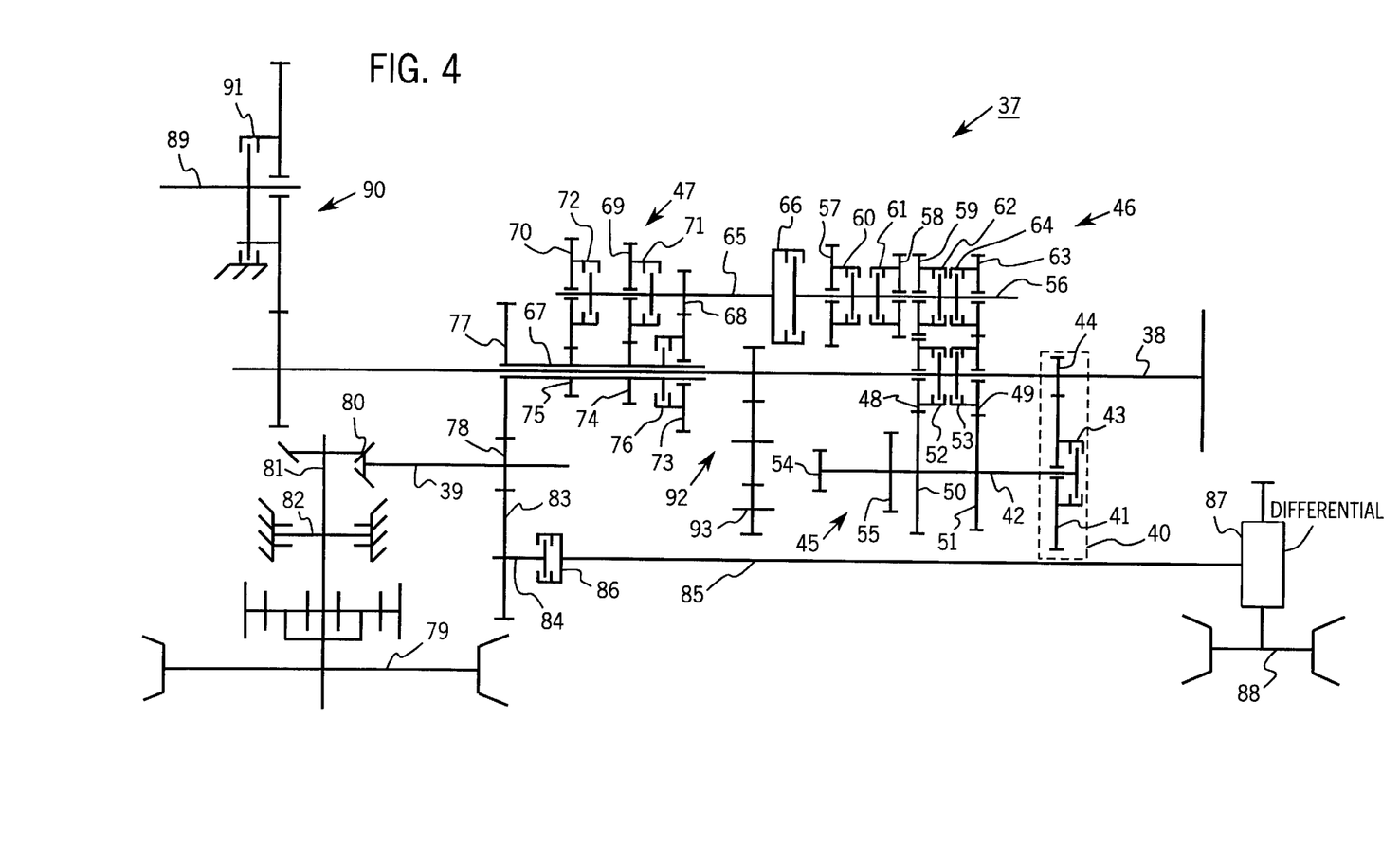
FIG. 4 is an schematic illustration of a power shift transmission.

A preferred multiple clutch power shift transmission for use with hydraulic clutches calibrated as described herein is illustrated in FIG. 4. This transmission is typical of transmissions employed for work vehicles having a plurality of forward and reverse gears, capable of power shifting between forward or reverse gears.

Turning more particularly to the structure and operation of transmission 37, while any one of a variety of transmissions may be controlled, FIG. 4 diagrammatically illustrates the presently preferred configuration. Transmission 37 is of a type known generally as a "powershift transmission," wherein several sets of gears are associated with transmission shafts and certain of the gears may be selectively rotationally fixed with respect to their shafts by engagement of an associated fluid clutch to define desired gear ratios between input shaft 38 and output shaft 39. In the transmission illustrated in FIG. 4, input shaft 38 is driven in rotation by the vehicle engine. Gear sets, along with associated fluid clutches and transmission shafts, permit a number of different gear ratio combinations to be defined for driving transmission output shaft 39 at desired speeds as follows.

A creeper gear set 40 includes a creeper gear 41 mounted on and rotational with respect to a second transmission shaft 42. A creeper clutch 43 is engageable to lock creeper gear 41 against rotation on shaft 42. Creeper gear set 40 also includes a gear 44 fixed to shaft 38 and continuously meshing with creeper gear 41. Engagement of creeper clutch 43 results in driving shaft 42 through gears 44 and 41 to obtain an extremely slow output speed of shaft 39. Creeper gear set 40 may be optionally excluded from transmission 37.

Transmission 37 includes three groups of gear sets, identified in FIG. 4 by the reference numerals 45, 46 and 47. First group 45 includes first and second gears 48 and 49 supported on and rotational with respect to shaft 38. Additional gears 50 and 51, fixed on second shaft 42 mesh continuously with gears 48 and 49, respectively. Fluid clutches 52 and 53 are associated with gears 48 and 49, respectively, and may be engaged to lock their associated gear against rotation on shaft 38. In operation, either clutch 52 or clutch 53 is engaged to obtain an input-to-output gear ratio, or both clutches may be released or disengaged to interrupt the transmission of power to shaft 42. In the preferred embodiment shown, gear combination 48 and 50 define a ratio 34:39, while gears 49 and 51 have a ratio of 37:37.

Second gear set group 46 includes gear 50, as well as to additional gears 54 and 55, all fixed on second shaft 42. Supported on a third transmission shaft 56 and rotational with respect to third shaft 56, three gears 57, 58 and 59 mesh continuously with gears 54, 55 and 50, respectively (actual meshing is not shown in FIG. 4). Fluid clutches 60, 61 and 62 are associated with gears 57, 58 and 59, respectively, and may be engaged to lock the associated gear against rotation on shaft 56. Thus, either one of clutches 60, 61 or 62 may be engaged to transmit power between second shaft 42 and third shaft 56, or all of the clutches may be released to interrupt power transmission between the shafts. In the preferred embodiment illustrated, gear combination 54 and 57 provide a gear ratio of 29:44, combination 55 and 58 provide a ratio of 34:39, and combination 50 and 59 provide a ratio of 39:34.

A reverse gear set is provided adjacent to second gear set group 49 on shaft 56, and includes a reverse gear 63 mounted on and rotational about shaft 56. A reverse clutch 64 is associated with reverse gear 63 and may be engaged to lock reverse gear against rotation with respect to shaft 56, placing transmission 37 in one of several reverse gear ratios.

Third shaft 56 is aligned with and may be selectively coupled to a fourth transmission shaft 65 via a master clutch 66. Thus, when master clutch 66 is fully engaged, shaft 65 rotates at the same speed and in the same direction as shaft 56. As discussed below, master clutch 66 is preferably modulated into and out of engagement, such as by pulse-width-modulating a proportional directional control valve. However, master clutch 66 may be mechanically or electro-mechanically modulated by techniques well known in the art.

Third gear set group 47 selective couples shaft 65 with a farther shaft 67 disposed about shaft 38. Third gear set group 47 includes a first gear 68 fixed to shaft 65, and a pair of gears 69 and 70 supported on and rotational with respect to shaft 65. Clutches 71 and 72 are associated with gears 69 and 70, respectively, and may be engaged to lock the associated gear against rotation on shaft 65. Gears 68, 69 and 70 mesh continuously with corresponding gears 73, 74 and 75, respectively, on shaft 67. Gear 73 is supported on and rotational with respect to shaft 67, whereas gears 74 and 75 are fixed to shaft 67. A fluid clutch 76 is associated with gear 73 and may be engaged to lock gear 73 against rotation on shaft 67. Thus, by selectively engaging either clutch 71, 72 or 76, shaft 67 is caused to rotate at a predetermined speed ratio as shaft 65 is driven in rotation. In the presently preferred embodiment, gear combination 68 and 73 provide a gear ratio of 22:54, combination 69 and 74 provide a ratio of 37:39, and combination 70 and 75 provide a ratio of 52:24.

Shaft 67 transmits power to transmission output shaft 39 through gears 77 and 78, fixed on shafts 67 and 39 respectively and arranged to continuously mesh with one another. As illustrated in FIG. 4, output shaft 39 transmits power to rear axle 79 through bevel gears 80 arranged to drive a differential input shaft 81. A master brake 82 is provided on shaft 81 for braking vehicle 10. In addition to driving rear axle 79, in the preferred embodiment illustrated in FIG. 4, gear 78 carried by output shaft 39 meshes with a further gear 83 supported on a front wheel drive clutch shaft 84. A front wheel drive shaft 85 may be selectively coupled to clutch shaft 84 by front wheel drive clutch 86, and extends to front wheel drive differential 87 for driving front axle 88.

In addition to the gearing described above, transmission 37 is preferably arranged for driving power take off shaft 89 via power take off gearing 90, including power take off clutch 91. Transmission 37 also includes gearing, designated generally by the reference numeral 92, for driving a hydraulic pump drive shaft 93.

The clutches contained in transmission 37 are preferably fluid clutches of a type known in the art. Such clutches are typically biased in a disengaged position and engageable by the application of pressurized fluid. Clutches 52, 53, 60, 61, 62, 64, 71, 72 and 76 in the presently preferred embodiment are engaged by hydraulic valves that are either on or off, and are operated by shifting them directly between pressure transmitting ("on") and pressure relieving ("off") positions. Such valves have a single engagement flow rate, and thus a single clutch fill time calibration value. Proportional hydraulic valves, for example, may also be employed in transmission 37. These valves are unlike on/off valves, in that proportional hydraulic valves provide a plurality of flow rates, and thus fill times. The plurality of flow rates are provided by modulating the valves into and out of engagement. For such valves, flow rate magnitude is a function of the input signal magnitude. In other words, for input signals of different magnitudes, a proportional hydraulic valve will provide different flow rates (and thus different clutch fill times). Such valves can therefore be calibrated according to the present invention, but the fill rate calibration will be a function of the input signal applied to such valve. The valve supplying master clutch 66 is an exception to the above. To permit smooth transitions in shifting, master clutch 66 is preferably modulated into and out of engagement by pulse width modulating a proportional directional control valve connected to master clutch 66. This is especially important when the work vehicle is stopped and the operator is shifting from neutral into a forward or reverse gear.

Several modes of shifting are possible with transmission 37. "Power shifting", e.g. direct shifting between selected gears when the vehicle is already engaged and moving in a particular direction without operating master clutch 66 may be performed by disengaging outgoing clutches (corresponding to the gear ratio being shifted from) while engaging incoming clutches (for the gear ratio being shifted to), in a coordinated and timed manner. "Skip shifting" is the technique of shifting between two different gear ratios, while skipping intermediate gear ratios. "Modulated shifting" is the technique of disengaging master clutch 66, disengaging the current gear ratio, engaging a desired gear ratio, then modulating the engagement of master clutch 66. Such modulated shifting is extremely useful in certain shifting situations, such as starting from a stop and shuttle shifting between forward and reverse gear ratios.

By engaging combinations of clutches, transmission 14 establishes a number of predetermined gear ratios between input shaft 38 and output shaft 39. In particular, for the transmission illustrated in FIG. 4, the following gear ratios are provided (the prefixes F, R, C and CR representing forward, reverse, forward creeper and reverse creeper gear ratios, respectively) that are numbered here in order of increasing gear ratios:

TABLE 1

| Gear ratio | Clutches engaged |
|---|---|
| F1 | 52, 60, 76; |
| F2 | 53, 60, 76; |
| F3 | 52, 60, 76; |
| F4 | 53, 61, 76; |
| F5 | 52, 61, 76; |
| F6 | 53, 62, 76; |
| F7 | 52, 60, 71; |
| F8 | 53, 60, 71; |
| F9 | 52, 61, 71; |
| F10 | 53, 61, 71; |
| F11 | 52, 62, 71; |
| F12 | 53, 62, 71; |
| F13 | 52, 60, 72; |
| F14 | 53, 60, 72; |
| F15 | 52, 61, 72; |
| F16 | 53, 61, 72; |

TABLE 1-continued

| Gear ratio | Clutches engaged |
|---|---|
| F17 | 52, 62, 72; |
| F18 | 53, 62, 72; |
| R1 | 52, 64, 76; |
| R2 | 53, 64, 76; |
| R3 | 52, 64, 71; |
| R4 | 53, 64, 71; |
| C1 | 43, 60, 76; |
| C2 | 43, 61, 76; |
| C3 | 43, 62, 76; |
| C4 | 43, 60, 71; |
| C5 | 43, 61, 71; |
| C6 | 43, 62, 71; |
| CR1 | 43, 64, 76; |
| CR2 | 43, 64, 71. |

Each column in the above chart identifies a group of clutches required to engage the transmission in any gear ratio. The first group (first column) includes clutches 52, 53, and 43. The second group (second column) includes clutches 60, 61, 62, and 64. The third group (third column) includes clutches 71, 72, and 76. Furthermore, for forward gear ratios, only one clutch of each gear set group 45, 46, 47 is engaged. Similarly, for reverse gear ratios, the reverse gear clutch 64 is engaged along with a clutch from the first and third gear set groups 45 and 47. Moreover, for creeper gear ratios, the creeper clutch 43 is engaged along with a clutch from the second gear set group 46 (or the reverse gear clutch 64) and a clutch from the third gear set group 47. For transmission of power through transmission 37, all the gear combinations require the engagement of master clutch 66.

Transmission 37 has thirteen clutches. As indicated by the TABLE 1 above, in order to provide a plurality of forward and reverse gear ratios, several clutches must be simultaneously engaged. Each of the clutches providing forward and reverse gear ratios shown in TABLE 1 may be operated during power shifting, and thus should be calibrated regularly. To provide for calibration of these clutches, pressure sensors and flow restrictors are provided as shown in FIG. 5.

Figure 5:
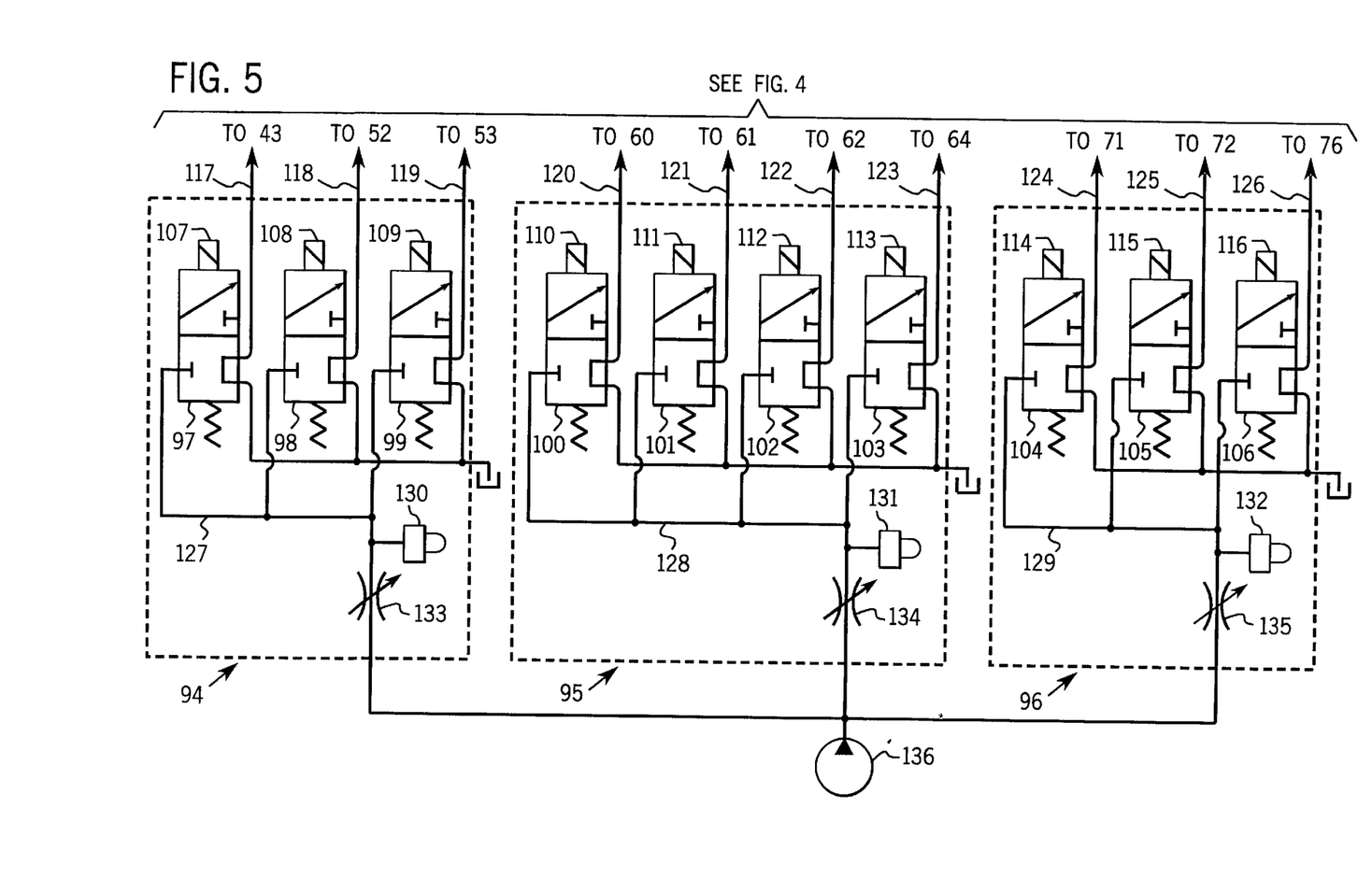
FIG. 5 is an schematic illustration of a manifold apparatus for calibrating clutch fill times for use with the transmission of FIG. 4 in accordance with the current invention.

FIG. 5 illustrates such a valve body arrangement for the valves associated with the three groups of clutches. Three valve bodies 94–96, include ten clutch valves 97–106, having valve solenoids 107–116 and output lines 117–126, respectively. Clutch valves 97–106 control clutches 43, 52, 53, 60, 61, 62, 64, 71, 72, and 76, respectively, by regulating the flow of hydraulic fluid to the clutches through output lines 117–126. The hydraulic supply sides of clutch valves 97–99, clutch valves 100–103, and clutch valves 104–106 are joined to common manifolds 127–129, respectively. Pressure transducers 130–132 are also connected to the valve bodies and are adapted to sense pressure in manifolds 127–129, respectively. Flow restrictors 133–135 are joined to manifolds 127–129, respectively, and to hydraulic supply 136.

The clutch valves for the clutches in the first column of TABLE 1 are arranged in valve body 94. The clutch valves for the clutches in the second column of TABLE 1 are arranged in valve body 95. The clutch valves for the clutches in the third column of TABLE 1 are arranged in valve body 96. For any of the gear ratios disclosed in TABLE 1, only one clutch in each group need be engaged simultaneously. Therefore only one clutch valve in each of the valve bodies need be energized simultaneously to perform any shift. Accordingly, the pressure transducers on each valve body are capable of calibrating the fill times of every clutch during every shift, since the pressure drop measured by each pressure transducer during any clutch engagement will be a function of the fill time of a single clutch. By sensing pressure changes at the inlet side of the clutch valves, rather than the pressure at each clutch, the number of pressure transducers required to calibrate the clutches can be reduced.

To engage the clutches, the appropriate solenoids are energized, opening a passage between the inlet side of the valves and the output lines, thereby allowing the passage of hydraulic fluid to the clutches. The fluid passes from the hydraulic supply, through the flow restrictors, into the manifolds, through the valves, through the output lines and into the clutches. The pressure transducers are positioned to provide a signal indicative of the pressure in their respective manifolds.

Valves 97–106 are preferably solenoid valves, having an "on" position, in which the valves are completely open, allowing flow from the hydraulic supply to their respective clutches, and an "off" position in which their respective output lines are disconnected from manifold 95 and are connected to a tank. Moreover, valves 97–106 preferably include reverse flow preventing check valves as indicated schematically in FIG. 5 for preventing pressure from being relieved from the clutches in the event pressure supply to a valve falls temporarily when the valve is in its energized state. Cartridge valves having a thread diameter of between $3/8$ and 1.5 inches are preferred. To provide the pressure transducer with the optimum sensible pressure drop upstream of valves 97–106, valves 97–106 must permit sufficient flow to fill their respective clutches, yet not generate a large pressure drop themselves. For this reason, each valve preferably should be selected to provide a hydraulic fluid flow rate of between 1 and 12 gallons per minute when a pressure differential of 300 kPa is applied across that valve. More preferably, each valve should provide a flow rate of 1.5 to 10 gallons per minute when a pressure differential of 300 kPa is applied across that valve. Most preferably, each valve should provide a flow rate of 2 to 8 gallons per minute when a pressure differential of 300 kPa is applied across that valve. The 300 kPa differential pressure mentioned here is used as a standard for determining the flow capacity of the valves. The actual pressure differential across the valves when in use may not be 300 kPa. Flow restrictors 133–135 may be simple orifices as shown here. It is more preferable, however, that they be adjustable. Most preferably the flow restrictor is a modulator of the type disclosed in FIG. 7 and the accompanying text.

Figure 6:
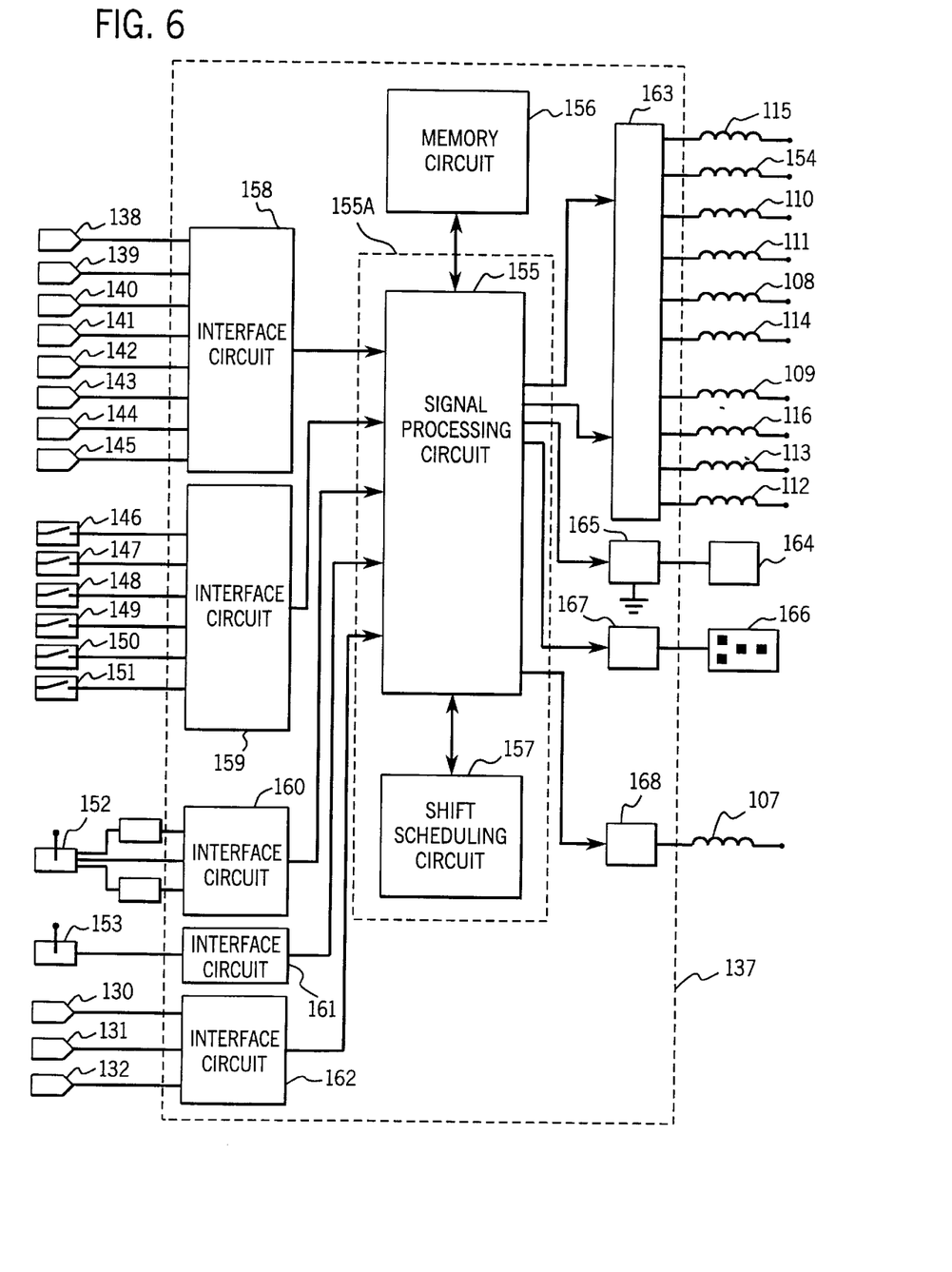
FIG. 6 is a schematic illustration of a transmission controller configured to engage, disengage and calibrate the FIG. 4 transmission using the manifold apparatus of FIG. 5.

FIG. 6 illustrates a control system, that provides for the operation of a work vehicle, including the engagement, disengagement, and calibration of clutches in the manner disclosed above. The control system includes transmission controller 137 which is responsive to speed sensors 138–142 generating signals indicative of transmission speed, axle shaft speeds, engine speed and ground speeds, switches and sensors indicative of clutch pedal position 143, 150, 151, additional sensors 144–45, and operator control switches 146–149, 152–153. Transmission controller 137 in turn controls clutch solenoids 107–116 and 154 to engage and disengage clutches 43, 53, 53, 60, 61, 62, 64, 71, 72, 76 and master clutch 66, respectively. In the presently preferred embodiment, controller 137 is a microprocessor-based digital controller including a signal processing circuit 155, typically configured through appropriate coding of a microprocessor 155A, such as an Intel 80C198 microcontroller. Controller 137 further includes appropriate memory circuitry 156, which preferably includes electronically erasable programmable read only non-volatile memory (EEPROM)

and random access and read only memory (RAM and ROM) for storing a preset, cyclic transmission control routine implemented by signal processing circuit 155; includes calibration values for the various clutches and other calibrated components of the control system; and includes various temporarily stored values used by controller 137, such as command values, sensed values and the like. A shift scheduling circuit 157, illustrated in FIG. 6 as separate from signal processing circuit 155 and memory circuit 156, but typically configured via coding within the microprocessor, functions with signal processing circuit 155 to schedule shifts into and out of gear ratios based upon the control routine executed by signal processing circuit 155.

Signal processing circuit 155 preferably includes an on-board analog-to-digital converter (not represented in FIG. 6) for converting input parameter signals directly to digital signals for processing. However, controller 137 will typically include interface circuits 158, 159, 160, 161, 162 for converting and conditioning the sensed and command signals produced by the system sensors and command devices into filtered signals, and for isolating signal processing circuit 155 from power surges and the like. Moreover, controller 137 includes valve driver circuits 163, for converting control signals output by signal processing circuit 155 into drive signals for energizing valve coils 108–116 and 154. Neutral latch circuit 164 is also coupled to signal processing circuit 155, which monitors the state of circuit 164 and controls grounding of circuit 164 via driver 165. Display 166 is coupled to signal processing circuit 155 through an interface circuit 167. Creeper clutch solenoid 107 is coupled to signal processing circuit 155 through an interface circuit 168. The particular configuration of interface and driver circuits 158–163, 165, 167–168 will vary depending upon the particular sensors, command devices and signal processing circuitry employed in the system. The construction and operation of such interface circuitry is well known to those skilled in the art.

In operation, sensors 138–145 continuously apply their sensed parameter signals to interface circuit 158, which filters and converts these signals to a range and form usable by signal processing circuit 155. Similarly, command devices 146–149, 152–153 apply signals to signal processing circuit 155 via their respective interface circuits 159–161, and pressure transducers 130–132 continuously apply their sensed pressure signals to interface circuit 162, which filters and converts these signals to a range and form usable by signal processing circuit 155. In particular, interface circuit 162 provides low pass filtering of the pressure signals to reject high frequency noise that may produce false minimum pressure readings, such as those taken in steps 24 and 28 of FIG. 3. Signal processing circuit 155 typically accesses the various command signals periodically as required by the transmission control routine stored in memory circuit 156. When automatic/manual switch 146 is placed in its "manual" position, transmission 37 may be shifted upon direct command from the vehicle operator by manipulation of a clutch pedal (not shown) and levers 152, 153. When automatic/manual switch 146 is placed in its "automatic" position, however, signal processing circuit 155 cycles through the transmission control routine as accessed from memory circuit 156 and, based upon the input and command signals applied by the sensors and command devices, determines when and how transmission 37 is to be shifted between the gear ratios described above, as well as when portions of the control system should be disabled, such as by interrupting the ground to neutral latch circuit 164. As will be appreciated by those skilled in the art, memory circuit 156 stores as part of the control routine, a table of gear ratios available through particular combinations of transmission clutches as described above. Shifts selected by signal processing circuit 155 are based upon these preset combinations. The overall transmission control routine may include various subroutines for controlling transmission operation in specific situations. Generally, however, the overall control routine permits modulated shifting, including modulated shuttle shifting, skip shifting and power shifting, all of which are techniques well known in the art.

Signal processing circuit 155 cooperates with shift scheduling circuit 157 to schedule the shifts (i.e. engagement and disengagement of combinations of clutches) identified by signal processing circuit 155. As mentioned above, in the presently preferred embodiment, signal processing circuit 155 and shift scheduling circuit 157 are configured in a programmed microprocessor, shift scheduling circuit 157 effectively being an aspect or subroutine of the overall control routine, adapted to schedule disengagement of "outgoing" clutches and engagement of "in-coming" clutches to obtain smooth transitions between gear ratios. Based upon this scheduling, signal processing circuit 155 generates appropriate control signals to energize and de-energize coils 107–116, and 154, and applies these control signals to the coils through driver circuits 163 and 168 to execute the selected shifts. The transmission controller signals the oncoming clutches to engage (e.g. energizes the on-coming clutch valve solenoids) and signals the off-going clutches to disengage (e.g. de-energizes the off-going clutch valve solenoids) as described above, thereby reducing or eliminating torque holes and transmission lock-up.

Just as each on-coming clutch may delay engaging while it is filling with fluid, each off-going clutch may also delay disengaging while it is emptying of fluid. To compensate for this disengagement delay, the transmission controller may reduce the delay between signaling the on-coming clutches to engage and signaling the off-going clutches to disengage by an amount of time representative of this disengagement delay.

In normal operation, a vehicle operator typically configures the control system for automatic or manual operation by manipulating automatic/manual switch 146. The operator may then preselect forward and reverse commanded gear ratios, as described below, which are displayed on display 166. In the preferred embodiment, these gear ratios may be preselected by the vehicle operator as described in greater detail below. Both the forward and reverse preselected gear ratios are then displayed on display 166. Controller 137 will then schedule shifts to obtain the commanded gear ratio upon forward/reverse/neutral/park ("FNRP") lever 152 being moved to either its "forward" or "reverse" position. Such shifting will typically be accomplished through the use of skip shifting, shuttle shifting and power shifting techniques as discussed above. During steady state operation of vehicle 10 in either the forward or the reverse direction, the preselected gear ratios indicated on display 166 will generally be engaged as the commanded gear ratio, unless changed by the operator. The operator may then increment or decrement the commanded gear ratio by moving the "bump" or "pulser" lever 153 to its "increment" or "decrement" position. Bump lever 153 may be held in either position to increment or decrement the commanded gear ratio through more than one ratio. Bump lever 153 is released once the desired commanded gear ratio is reached. Bump lever 153 thus increments or decrements the gear ratio in the direction then currently selected via FNRP lever 152 (i.e. forward or reverse). As the forward and reverse gear ratios are incremented or decremented, these changes are indicated on display 166 and forward and reverse gear ratios stored in the memory circuit 156 are updated as described below. In response to such increments and decrements, controller 137 schedules and executes shifts to the desired gear ratio.

When power shifting, whether in automatic or manual mode, controller 137 must schedule clutch engagements and disengagements to avoid a torque hole or damage to the transmission, as explained above. Whenever controller 137 executes a shift, therefore, it energizes the oncoming clutch valve, refers to a table of clutch fill times contained in memory circuit 156, and refers to a second table in memory circuit 156 for de-energizing the off-going clutch valve. Memory circuit 156 may contain several clutch fill time tables, each table corresponding to the clutch fill times for a particular shift. For example, the clutch 53 fill time when shifting from the F3 to F4 gear ratios of TABLE 1 might be longer that the clutch 53 fill time when shifting from the F5 to F6 gear ratio. Controller 137 is further configured to read pressure transducers 130–132, thereby providing real-time valve inlet pressure measurements as the transmission is operated. Controller 137 takes pressure measurements during each shift for each clutch engagement, determines the time required to fill each clutch as it is engaged, and records these pressure and time measurements in the fill time tables in memory circuit 156. Since these fill times may vary depending on the shift to be made (e.g. F3 to F4, versus F5 to F6) controller 137 can record a plurality of clutch fill times for each clutch, each fill time saved in a location indicative of a different gear ratio. Controller 137 further calculates the time between on-going clutch valve energization and incipient clutch engagement in accordance with the description accompanying FIG. 1 and the flow chart of FIG. 3 to update the table of clutch fill times. Hydraulic fluid temperature has a large influence on clutch fill times. Although the method of updating clutch fill times as each shift is executed is adaptive, shift quality can suffer on subsequent engagements if the work vehicle is stopped and the hydraulic fluid is allowed to cool. Consequently, tables of fill times calibrated at different hydraulic fluid temperatures is maintained as well, by measuring a temperature indicative of hydraulic fluid temperature at each shift. If the work vehicle is stopped for an extended period of time, transmission controller 137 can select an initial clutch fill time value from memory 156 appropriate for the current temperature. Ideally, this would only be necessary for the first engagement of each clutch at the cooler temperature, since each clutch would be recalibrated during its initial post-cooling shift. To select the proper clutch fill time, transmission controller 137 retrieves clutch fill times from memory 156 based upon hydraulic fluid temperature, and thus clutch fill time values are saved in locations in memory that are indicative of temperature. Thus, when scheduling shifts, the transmission controller can select the appropriate clutch fill time based both upon the current temperature of the hydraulic fluid and the particular shift to be performed. Thus, the system is adapted to field calibrate clutch fill time values during each transmission shift and is further adapted to retrieve these values and use them to properly schedule succeeding shifts, thereby providing adaptive control of transmission shifting responsive to changing environmental conditions during actual operation of the transmission.

A simple flow restrictor, such as the orifice in the FIG. 1 clutch calibration apparatus is sufficient to calibrate the fill time of a clutch. When such a device is used in a work vehicle for calibrating transmission clutches during actual operation of the vehicle, however, a fixed orifice may cause too-rapid gear engagement and gear banging. Preferably, a flow restrictor adapted to allow calibration of a transmission during operation modulates hydraulic fluid flow to a clutch valve as the clutch fills, reducing flow substantially at the point of incipient engagement to prevent such damage. By way of modification, therefore, flow restrictors 16 and 133–135 may be replaced by flow restrictor 169 disclosed in FIG. 7. Flow restrictor 169 has an inlet 170, an outlet 171, an unloading valve 172, and a modulator valve 173. Hydraulic fluid is supplied to inlet 170, and outlet 171 is connected to the inlet of the clutch valve (not shown). This embodiment is a hydro-mechanical modulator, responsive to changes in pressure or flow.

Figure 7:
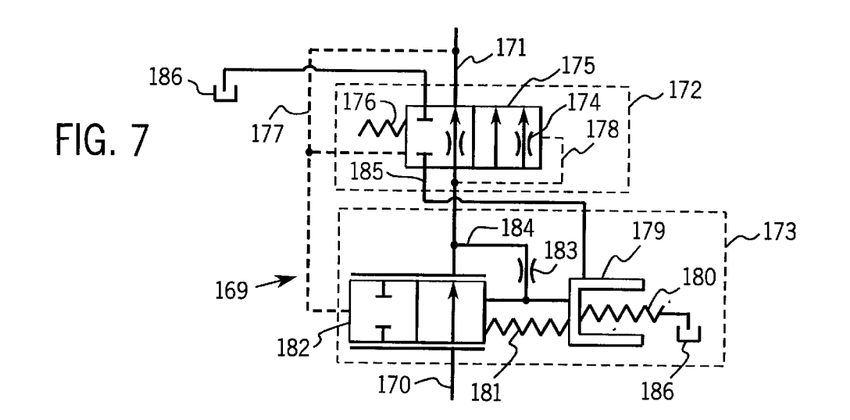
FIG. 7 is a schematic illustration of a preferred flow restrictor for the manifold apparatus of FIG. 5.

Unloading valve 172 is a spool valve, having an orifice 174 for restricting hydraulic fluid flow during the initial portion of the clutch filling process. Hydraulic fluid flowing through orifice 174 creates a pressure drop across the orifice that is monitored by the pressure transducer (not shown). Unloading valve 172 includes a spool 175 and a spring 176. The unloading valve is responsive to the pressure at outlet 171, as shown by the connection of pilot line 177 to a first end of unloading valve 172. Unloading valve 172 is also responsive to the hydraulic pressure between modulator valve 173 and unloading valve 172 (called the "check pressure"), as shown by the connection of pilot line 178 to a second end of the unloading valve. The unloading valve unloads modulator valve 173, which will be explained below.

Modulator valve 173 includes modulator piston 179, modulator piston spring 180, check pressure spring 181, modulator valve spool 182, and an unloading orifice 183. Modulator valve 173 is responsive to the pressure at the outlet, as shown by the connection of pilot line 177 to a first end of modulator valve 173. Modulator valve 173 is also responsive to the check pressure, as shown by the connection of pilot pressure line 184 to a second end of modulator valve 173 through orifice 183.

The modulator valve and the unloading valve cooperate in the following manner. When the clutch valve connected to the outlet are closed, there is no hydraulic fluid flow through orifice 174, and thus no pressure drop across the orifice. The check pressure and the solenoid supply pressure are therefore the same. Since these two pressures act simultaneously on opposing ends of valve spools 175 and 182, they balance, and the spools assume the positions shown in FIG. 7 due to the operation of springs 176, 180, and 181. When a clutch valve connected to the outlet of flow restrictor 169 is opened, fluid flows into the valve and the pressure at outlet 171 drops. This unbalanced pressure causes unloading valve spool 175 to shift rightwardly, thereby connecting unloading line 185 to tank 186. As a result of this unloading, pressure on modulator piston 179 drops, and modulator piston spring 180 impels the modulator piston toward modulator valve spool 182, compressing check pressure spring 181. Hydraulic fluid is metered through orifice 183, and escapes around the edge of modulator piston 179 into line 184 and thence to tank 186. The action of opposing springs 180 and 181 serve to maintain piston 179 in a constant position, and thus to maintain a constant and reduced check pressure on the right-most end of modulator valve spool 182. This reduced pressure does not shift modulator valve spool 182 rightwardly, however, because pressure on the leftmost end of the spool is reduced, due to the pressure drop across orifice 174. Thus full flow through modulator valve 173 is maintained during the initial clutch filling period.

When the clutch is substantially filled with fluid, however, hydraulic fluid flow rate to the clutch essentially stops, decreasing from several gallons per minute to a few milliliters per minute, and generates a sudden pressure increase as the clutch piston stops moving and the various hydraulic components downstream of the valve begin to flex outwardly. This appears as a rapidly rising pressure at outlet 171. To prevent a too-rapid pressure rise, possible gear banging and potential damage to the clutches and gears, flow restrictor 169 responds to this reduced flow and increased pressure and substantially restricts hydraulic fluid flow, limiting the maximum rate of hydraulic pressure increase at the outlet of the modulator. The preferred maximum rate of pressure increase is between 170,000 kPa/sec and 1700 kPa/sec. More preferably the maximum rate of pressure increase is between 85,000 kPa/sec and 2267 kPa/sec. Most preferably the maximum rate of pressure increase is between 56,000 kPa/sec and 3400 kPa/sec. Flow restrictor 169 reduces flow in the following manner. As the initial pressure increase appears at the outlet, the pressure begins rising in pilot line 177. Increasing pressure in line 177, combined with the spring force of spring 176 applied to the leftmost end of unloading spool 175 overcomes the force applied by hydraulic fluid in pilot line 178 acting on the rightmost end of unloading valve spool 175, and the spool shifts to the right, blocking off tank 186.

As the pressure at the outlet further increases, the pressure increases in pilot line 177 and shifts modulator valve spool 182 to the right, substantially cutting off flow through spool 182. The modulator valve acts as a flow restrictor, allowing limited flow, typically on the order of a few milliliters per minute to fill the clutch, thereby providing a restriction much greater than the restriction provided by orifice 174. By proper selection of orifice 183 and springs 180 and 181, the slope of the rising clutch pressure curve can be tailored to provide for clutch engagement sufficiently gradual to avoid damage to the transmission.

Figure 8:
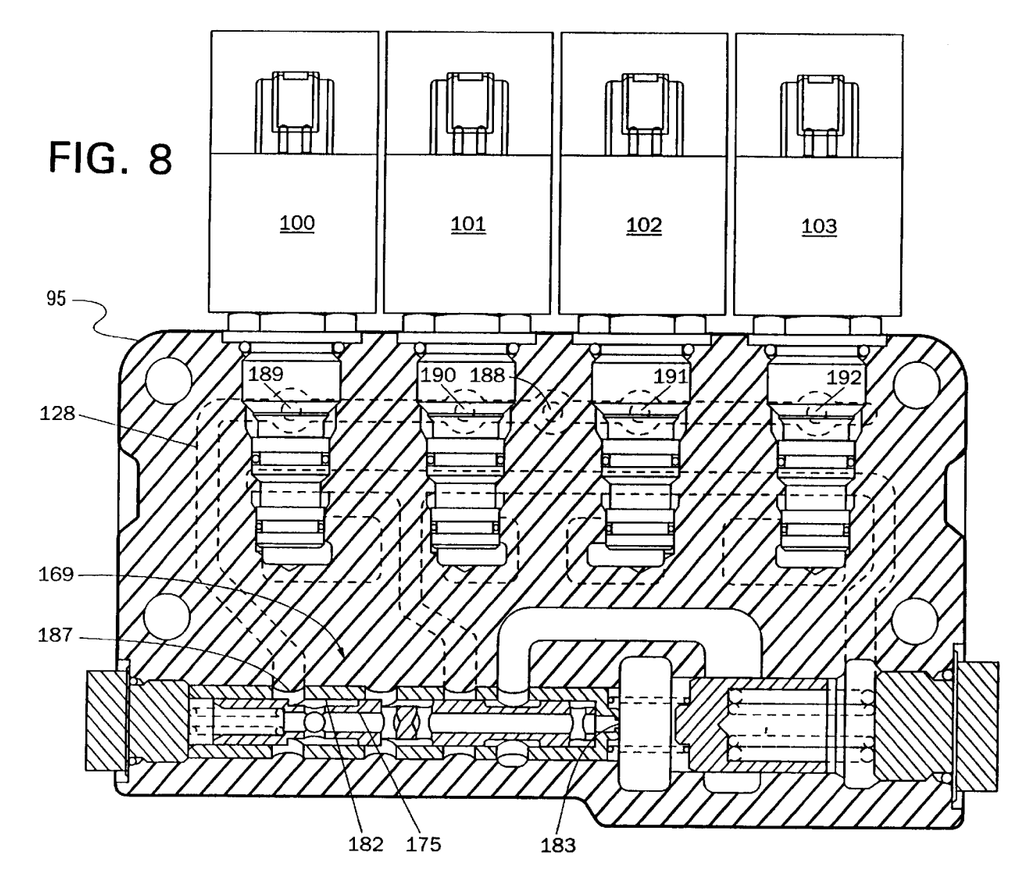
FIG. 8 is a partial cross-sectional view of the manifold apparatus of FIG. 5 incorporating the flow restrictor of FIG. 7.

FIG. 8 illustrates a cross-sectional view of an integral valve body 95 and valves 100–103, the valve body having flow restrictor 169 rather than the variable orifice shown in FIG. 6. The operation of flow restrictor 169 is described above in conjunction with FIG. 7. FIG. 8, however, shows the preferred configuration of valve body 95 as a unitary structure with integral manifold 128, valves 100–103 and flow restrictor 169. Flow restrictor 169 is here shown in its preferred embodiment having concentric nested unloading and modulator valve spools 174, 182 with orifice 183 formed in one end of modulator spool 182. Manifold 128 connects the inlets of valves 100–103 to the outlet 187 of flow restrictor 169. Pressure transducer 131 (not shown) is fluidly coupled to port 188 and is configured to sense hydraulic pressure in the manifold. Flow restrictor 169 is most effective when tailored for a particular initial flow rate. Additional flow restrictors, here embodied as orifices 189–192 (indicated by dashed lines) at the inlet of valves 100–103, respectively, are configured to reduce fluid flow from the manifold to individual clutches when the clutches are being rapidly filled with fluid, thereby providing a substantially constant flow rate into each clutch during the initial clutch filling period. The effective orifice diameter of such additional flow restrictors is preferably between 0.06 and 0.30 inches for the range of clutch sizes commonly used in work vehicles. The FIG. 8 valve body includes valves 100–103, none of which are simultaneously energized to open and fill more than one clutch at a time in order to provide any of the gear ratios shown in TABLE 1. Valve bodies 94, and 96 (not shown) are similarly arranged to the FIGURE valve body 95 differing only in the number of valves attached to the valve bodies. Valve bodies 94 and 96 have three valves each. With the above valve body arrangement, each clutch engageable in power shifting may be individually calibrated during each shift during actual operation of the vehicle.

Other substitutions, modifications, changes and omissions may be made to the design and arrangement of the preferred embodiment without departing from the spirit of the invention as expressed in the appended claims.

We claim:

1. In a vehicle having a power shift transmission engageable in a plurality of gear ratios by engaging and disengaging first and second fluid clutches with a fluid from a fluid supply, a clutch control system comprising:

a first clutch fill valve fluidly coupled to the first clutch to control the flow of the fluid to said first clutch;

a second clutch fill valve fluidly coupled to the second clutch to control the flow of the fluid to the second clutch wherein the first and second clutch fill valves are not both engaged to permit the flow of fluid into their respective clutches during engagement of any forward gear ratio of the plurality of gear ratios;

a manifold fluidly coupled to the first and second clutch valves to conduct the fluid from the fluid supply to the first and second clutch valves;

a first flow restrictor disposed between the manifold and the fluid supply to restrict the flow of the fluid from the fluid supply to the manifold; and a pressure transducer in fluid communication with the manifold to generate a signal representative of the pressure of the fluid within the manifold.

2. The apparatus of claim 1, wherein the first flow restrictor is configured to restrict the flow of fluid into the first clutch when the first valve is opened, and to restrict the flow of fluid into the second clutch when the second valve is opened.

3. The apparatus of claim 2, wherein the first flow restrictor includes a hydro-mechanical modulator.

4. The apparatus of claim 3, wherein the first flow restrictor is responsive to fluid pressure at the outlet of the first flow restrictor to limit the rate of pressure increase at the outlet of the modulator to between 1700 and 170,000 kPa/sec.

5. The apparatus of claim 4, wherein the first and second clutch valves provide a fluid flow rate of between 1 and 12 gallons per minute when a pressure differential of 300 kPa is applied across the first and second clutch valves, respectively.

6. The apparatus of claim 4, wherein the first and second clutch valves provide a fluid flow rate of between 2 and 8 gallons per minute when a pressure differential of 300 kPa is applied across the first and second valves, respectively.

7. The apparatus of claim 6, wherein the first and second valves are cartridge valves, the manifold is disposed within an integral valve body, and the pressure transducer is fixed to the valve body.

8. The apparatus of claim 7, further comprising an additional flow restrictor having an effective orifice diameter of between 0.060 and 0.300 inches, disposed between the first flow restrictor and the first clutch, to restrict fluid flow from the fluid supply to the first clutch and not to the second clutch.

9. In a vehicle having a power shift transmission engageable in a plurality of gear ratios by engaging and disengaging first and second fluid clutches with a fluid from a fluid supply, a clutch control system comprising:

first fluid control means for controlling the flow of the fluid to the first clutch, second fluid control means for controlling the flow of the fluid to the second clutch, wherein the first and second fluid control means are not both engaged to permit the flow of fluid into their respective clutches during engagement of any forward gear ratio of the plurality of gear ratios;

manifold means for conducting the flow of fluid from the fluid supply to the first and second control means;

first flow restrictor means for restricting the flow of the fluid from the fluid supply to the manifold means; and pressure sensing means for generating a signal representative of the pressure of the fluid within the manifold means.

10. The apparatus of claim 9, wherein the first flow restrictor means restricts the flow of fluid into the first clutch when the first fluid control means is opened, and restricts the flow of fluid into the second clutch when the second fluid control means is opened.

11. The apparatus of claim 10, wherein the first flow restrictor means includes a hydro-mechanical means for modulating flow from the fluid supply to the first and second clutches.

12. The apparatus of claim 11, wherein the first flow restrictor means is responsive to fluid pressure at an outlet of the first flow restrictor means to limit the rate of pressure increase at the outlet of the hydro-mechanical modulator means to between 1700 and 170,000 kPa/sec.

13. The apparatus of claim 12, wherein the first and second fluid control means provide a fluid flow rate of between 1 and 12 gallons per minute when a pressure differential of 300 kPa is applied across the first and second fluid control means, respectively.

14. The apparatus of claim 13, wherein the first and second fluid control means provide a fluid flow rate of between 2 and 8 gallons per minute when a pressure differential of 300 kPa is applied across the first and second fluid control means, respectively.

15. The apparatus of claim 14, wherein the first and second fluid control means include cartridge valves, the manifold means and the flow restrictor means are disposed within an integral valve body, and the pressure sensing means is fixed to the valve body.

16. In a vehicle having a transmission for propelling the vehicle in a plurality of gear ratios, the gear ratios engageable by a plurality of clutches, such that a first and a second one of the plurality of clutches are never both engaged to provide any of the gear ratios, and such that a third and a fourth of the plurality of clutches are never both engaged to provide any of the gear ratios, a clutch control system comprising:

a first clutch fill valve, fluidly coupled to the first of the plurality of clutches to control the flow of the fluid to the first clutch;

a second clutch fill valve fluidly coupled to the second of the plurality of clutches to control the flow of the fluid to the second clutch;

a first manifold fluidly coupled to the first and second clutch valves to conduct the fluid from the fluid supply to the first and second clutch valves;

a first flow restrictor disposed between the first manifold and the fluid supply to restrict the flow of the fluid from the fluid supply to the first manifold; and a first pressure transducer fluidly communicating with the first manifold to generate a signal representative of the pressure of the fluid within the first manifold.

17. The apparatus of claim 16, further comprising:

a third clutch fill valve fluidly coupled to the third of the plurality of clutches to control the flow of the fluid to the third clutch;

a fourth clutch fill valve fluidly coupled to the fourth of the plurality of clutches to control the flow of fluid to the fourth clutch;

a second manifold fluidly coupled to the third and fourth clutch valves to conduct the fluid from the fluid supply to the third and fourth clutch valves;

a second flow restrictor disposed between the second manifold and the fluid supply to restrict the flow of the fluid from the fluid supply to the first manifold, and a second pressure transducer fluidly communicating with the second manifold to generate a signal representative of the pressure of the fluid within the second manifold.

18. The apparatus of claim 17, wherein the first flow restrictor is configured to restrict the flow of fluid into the first clutch when the first valve is opened, and to restrict the flow of fluid into the second clutch when the second valve is opened, and wherein the second flow restrictor is configured to restrict the flow of fluid into the third clutch when the third clutch valve is opened, and to restrict the flow of fluid into the fourth clutch when the fourth clutch valve is opened.

19. The apparatus of claim 18, wherein the first and second flow restrictors include first and second hydro-mechanical modulators, respectively.

20. The apparatus of claim 19, wherein the first and second flow restrictors are responsive to fluid pressure at the outlet of the first and second flow restrictors, respectively, to limit the rate of pressure increase at the outlet of the modulator to between 1700 and 170,000 kPa/sec.

21. The apparatus of claim 20, wherein the first, second, third, and fourth clutch valves provide a fluid flow rate of between 1 and 12 gallons per minute when a pressure differential of 300 kPa is applied across the first, second third and fourth clutch valves, respectively.

22. The apparatus of claim 21, wherein the first, second, third, and fourth clutch valves provide a fluid flow rate of between 2 and 8 gallons per minute when a pressure differential of 300 kPa is applied across the first, second, third, and fourth clutch valves, respectively.

23. The apparatus of claim 22, wherein the first, second, third, and fourth clutch valves are cartridge valves, the first and second manifolds are disposed within first and second integral valve bodies, respectively, and the first and second pressure transducers are fixed to the first and second valve bodies, respectively.

24. The apparatus of claim 23, further comprising an additional flow restrictor having an effective orifice diameter of between 0.060 and 0.300 inches, disposed between the first flow restrictor and the first clutch, to restrict fluid flow from the fluid supply to the first clutch and not to the second clutch.

* * * * *